United States Patent [19]
Sugisawa et al.

[11] Patent Number: 5,153,036
[45] Date of Patent: Oct. 6, 1992

[54] TEMPERATURE SENSING ELEMENT

[75] Inventors: Ko Sugisawa; Masaru Shibuki; Imayoshi Imada, all of Nara; Tamotsu Kamoda, Osaka, all of Japan

[73] Assignee: House Food Industrial Company Limited, Higashiosaka, Japan

[21] Appl. No.: 607,759

[22] Filed: Oct. 30, 1990

Related U.S. Application Data

[60] Division of Ser. No. 353,205, Apr. 27, 1989, abandoned, which is a continuation of Ser. No. 4,790, Jan. 7, 1987, abandoned.

[30] Foreign Application Priority Data

Jan. 24, 1986 [JP] Japan .................. 61-13285

[51] Int. Cl.$^5$ .......................... B23K 15/10; H05B 6/80
[52] U.S. Cl. ........................ 428/34.1; 116/216; 219/10.55 E; 426/88; 428/343; 428/913
[58] Field of Search ............. 428/913, 34.1, 343; 426/88; 219/10.55 E; 116/216, 207, 103

[56] References Cited

U.S. PATENT DOCUMENTS

| | | | |
|---|---|---|---|
| 4,154,107 | 5/1979 | Giezen et al. | 116/207 X |
| 4,188,437 | 2/1980 | Rohowetz | 116/207 X |
| 4,786,773 | 11/1988 | Keefer | 219/10.55 E |

FOREIGN PATENT DOCUMENTS 2006470  5/1979  United Kingdom .

*Primary Examiner*—Jenna L. Davis
*Attorney, Agent, or Firm*—Oblon, Spivak, McClelland, Maier & Neustadt

[57] ABSTRACT

A temperature sensing element comprises a heat-shrinking film and a fixing means for fixing the heat-shrinking film to an article to be monitored such as a food vessel. The element indicates that the content of the food vessel being heated by a microwave oven reached a given temperature range.

10 Claims, 4 Drawing Sheets

TEMPERATURE SENSING ELEMENT

This application is a division of application Ser. No. 07/353,205 filed on Apr. 27, 1989, now abandoned, which is a continuation of Ser. No. 004,790 filed Jan. 7, 1987, now abandoned.

FIELD OF THE INVENTION

This invention relates to a novel temperature sensing element for indicating the temperature of an article heated by, for instance, a microwave oven, which utilizes a property of a heat-shrinking film which shrinks under heating.

BACKGROUND OF THE INVENTION

Drawn films are also called heat-shrinking films and have been widely used for wrapping goods and foods. There are many types of such films on the market. However their use is limited mainly to the wrapping field.

Meanwhile, microwave ovens are becoming more and more popular because of their safety and convenience. However, their history is rather short and therefore, it is desired to further develop various uses for the microwave ovens.

BRIEF DESCRIPTION OF THE INVENTION

In accomplishing this invention the present inventors focused on the characteristics of heat-shrinking films and the fact that the heating principle of a microwave oven is unique and different from that of an ordinary oven. The present invention creates a new use for the heat-shrinking films in addition to the use as wrapping materials.

The present invention provides a temperature sensing element comprising a heat-shrinking film and a fixing means to fix the heat-shrinking film to an article.

BRIEF DESCRIPTION OF THE FIGURES

The accompanying

DETAILED DESCRIPTION OF THE INVENTION

Figure 1:
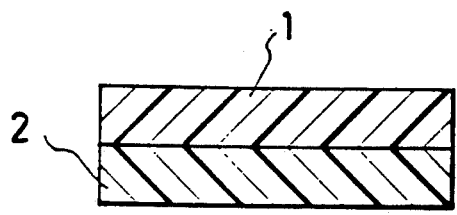
FIGS. 1 to 4 and 12 to 14 are cross-sectional views of exemplary temperature sensing elements according to this invention.

The "heat-shrinking film" used herein means a film which shrinks in one direction or in two crossing directions at a given temperature due to heat transfer from an article heated by a microwave oven or the like. Commercially available shrinking films may be used as the heat-shrinking film in this invention.

The shrinking films are usually prepared from polyethylene, irradiated polyethylene, polypropylene, polyvinyl chloride, polyvinylidene chloride, polyesters, polystyrene or Pliofilm by drawing methods such as flat-type two-step biaxial drawing, flat-type simultaneous biaxial drawing, tube-type two-step drawing and tube-type one step drawing.

In the present invention, any of the aforesaid shrinking films may be used, but films having a shrinking ratio of at least 25%, preferably at least 40%, are preferable as they more clearly indicate that a given temperature is attained. The shrinking ratio referred to herein is defined by the formula:

$$\text{Shrinking ratio (\%)} = \frac{\text{Film length before shrinkage} - \text{Film length after shrinkage}}{\text{Film length before shrinkage}} \times 100$$

In order to further clearly indicate that a given temperature is reached, it is preferred that the shrinking ratio in a given temperature range be relatively large. For instance, it is best to use a film which shrinks in a given temperature range by at least 45%, preferably by at least 60%, of the possible total shrinkage of this film. In the case where the temperature range of an article to be monitored is 60° to 140° C., the material of the film is preferably polyvinyl chloride. In the case where the temperature range of an article to be monitored is 90° to 180° C., the material of the film is preferably polypropylene.

It is also usually preferred that the shrinking film have a thickness of at least 10 microns.

As stated above, the material of the shrinking film should be chosen in view of the envisaged heat-shrinking temperature range. In addition, the shrinking film may have different temperature ranges between the longitudinal and transverse directions. In such a case, if the shrinking temperature range in the longitudinal direction is lower than that in the transverse direction, shrinkage of the film in the longitudinal direction during heating indicates that the article is heated to a certain temperature, and shrinkage of the film in the transverse direction during further heating indicates that the article has reached a given higher temperature. Thus, two levels temperature indication is possible.

It is preferred that the film have a size of about 2×1 cm or larger to make it easier to observe the state of the film visually from the outside of a microwave oven during cooking.

For the same purpose as above, it is preferable to use a film pigmented with a fluorescent dye or a reflective film. It is preferred for easier observation that the film be yellow or yellowish green. The film may be printed so that a pattern appears after shrinking. Further, it is also possible to color the film differently from the article or the fixing means so as to make it easier to observe the shrinking state of the film by the aid of color contrast.

Any means may be used as the fixing means for fixing the heat-shrinking film to an article, provided that it can fix the heat-shrinking film to the article under conditions in which heat is transferred from the article during heating so that the film does not peel off from the article due to heating by a microwave oven or the like and further that it can fix the film in such a way that it does not hinder the film from shrinking by heat. The fixing means will be explained below in detail.

(A) Adhesive

Adhesives may be used as the fixing means. For instance, rubber polymers such as natural rubber, regenerated rubber, butadiene-acrylonitrile rubber, neoprene rubber, polyurethane rubber, butyl rubber, SBR and polyisoprene rubber, synthetic resin polymers such as acrylic resin copolymers may be used. This embodiment is shown in FIG. 1, wherein the numeral 1 is a heat-shrinking film and 2 is an adhesive. Heat resistant rubber polymers such as regenerated rubber, butadiene-acrylonitrile rubber, neoprene and polyurethane rubber are preferred in that sufficient bonding strength is ensured even during heating and in that handling is easy. The adhesive strength can be regulated to proper degree relation to the shrinking tension of the heat-shrinking film by adding an adhesion-enhancing agent or softening agent to these adhesives (polymers).

The above-mentioned adhesives may usually be applied either over the whole area or over a part of the area of one side of the heat-shrinking film. For instance, shrinking of the film may be made easier by applying the adhesive only on a central part of the film. Further, by applying the adhesive on a central area smaller than the area of the film after shrinking, it is possible to make it easier to peel off the film by grasping the unbound part after heating.

It is also possible to facilitate the aforesaid peeling-off after heating by not applying the adhesive on an end portion of the film.

(B) Adhesive tape

Figure 2:
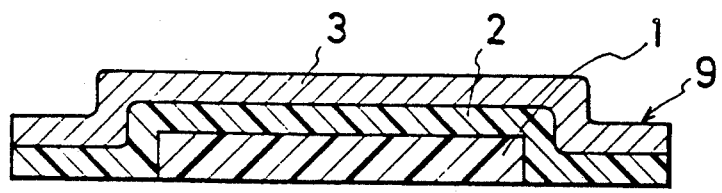

FIG. 2 shows an adhesive tape 9 composed of substrate 3 and adhesive 2. Substrate 3 may be of any material, provided that it is resistant to heating by, for instance, a microwave oven. Synthetic resin film tapes such as polyvinyl chloride, polypropylene, polyethylene and polyesters, paper tape, cloth tape, rubber tape and metal foil tape may be used.

As the adhesive, the aforesaid adhesives may be used here. In the case where the whole of film 1 is covered with adhesive tape 9 as in FIG. 2, the adhesive tape should be transparent. Further, an undercoating agent such as a mixture of the adhesive and the substrate material or a graft polymer may be applied on the adhesive tape to enhance adhesion between the adhesive and the substrate, as occasion demands. Covering materials such as a release papar coated with silicone may be used to cover the part of the adhesive on the tape until it is used.

(C) Combination of hollow cover and adhesive or adhesive tape

Figure 3:
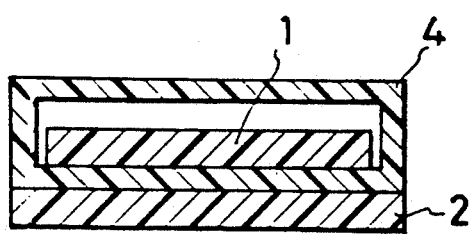
Figure 4:
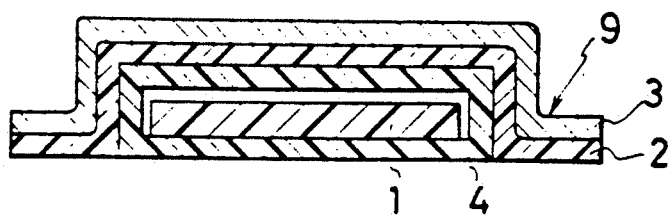

In FIGS. 3 and 4, numeral 4 denotes a hollow cover such as, for instance, a transparent hollow tube made of polypropylene, nylon, polyethylene terephthalate or the like. For facilitating heat shrinking of film 1, it is preferable that the inner dimension of hollow cover 4 be a little larger than the size of film 1 contained therein.

Figure 5:
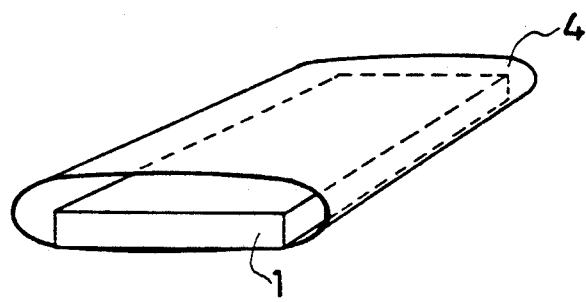
FIGS. 5 to 7 are cross-sectional or perspective views of examples where a hollow tube or the like is used as a hollow cover.
Figure 6:
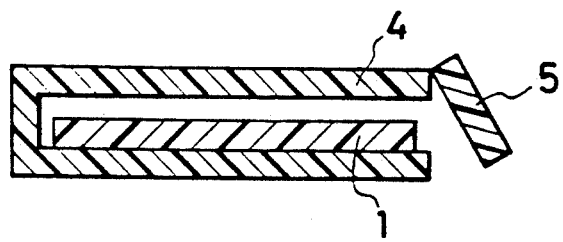
Figure 7:
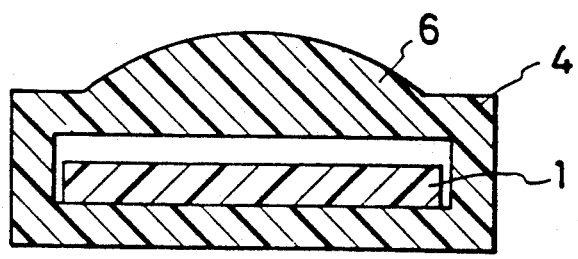

The shape of hollow cover 4 is not particularly restricted and may be tubular as in FIG. 5, may have a lid 5 as in FIG. 6 or may be formed in part as a convex lens 6 to make observation of film 1 easier as in FIG. 7. Adhesive 2 and adhesive tape 9 used in this embodiment are the same as described above.

Film 1 in hollow cover 4 may be free or may be fixed in part to hollow cover 4 or the adhesive tape 9.

Figure 8:
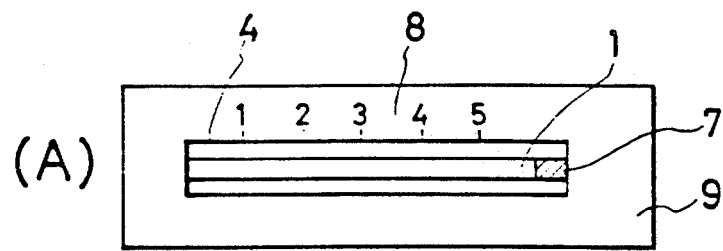
FIGS. 8 to 10 are plan views of temperature sensing elements according to this invention.
Figure 8:
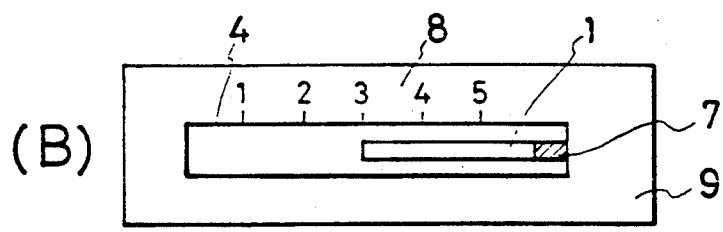
Figure 9:
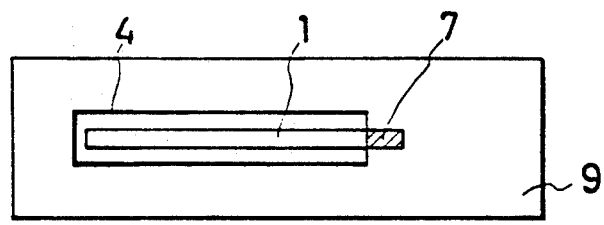
Figure 10:
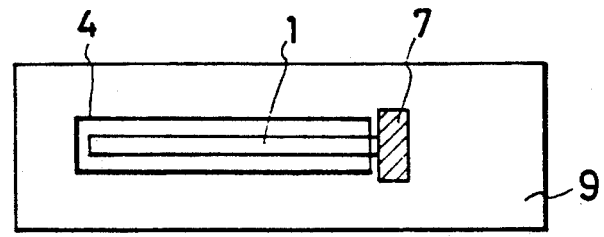
Figure 11:
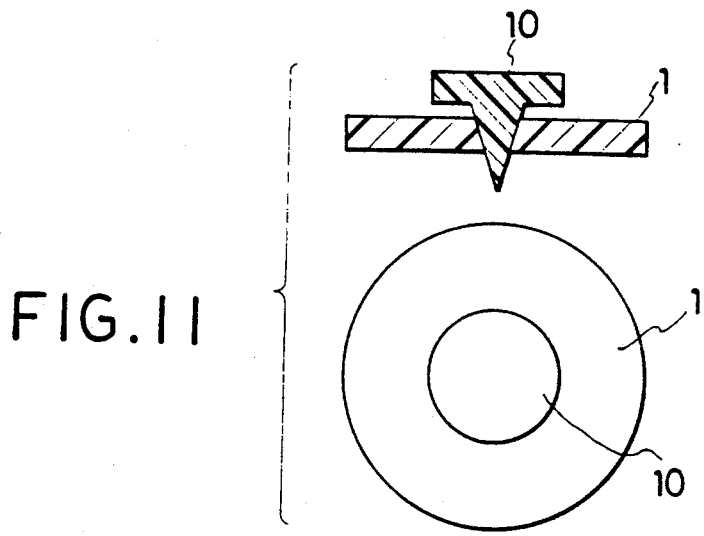
FIG. 11 are a cross-sectional and a plan view of a temperature sensing element according to this invention.

FIG. 8 (A) shows the temperature sensing element of the invention before heating, where adhesive tape 9 is used as a part of the fixing means. One end of heat-shrinking film 1 which is contained in hollow cover 4 is fixed to the hollow cover at the part indicated by numeral 7. When this temperature sensing element is attached to an article and heated, heat-shrinking film 1 shrinks to indicate the extent of heating as shown in FIG. 8 (B). In this case, the extent of heating may be indicated more clearly by providing gauge 8 for adhesive tape 9. This gauge 8 may be printed on an article to be heated, for example, in the case where an adhesive is used as the fixing means as in FIG. 1. Fixed part 7 of heat shrinking film 1 may be formed as integrated with the fixing means or as engaging the heat shrinking film 1 with the fixed part 7 as shown in FIGS. 9 and 10, respectively.

(D) Push pin

Heat shrinking film 1 may be fixed to an article by a push pin as in FIGS. 11 to 14. The shape and material of the push pin are not particularly restricted, provided that they are such that the push pin can fix the heat shrinking film. Push pins made of synthetic resins such as polypropylene can be conveniently used. It is possible to provide a hole 11 in the center of a push pin 10 as in FIG. 12 so that the hole 11 permits water vaper generated by heating to escape. The heat sensing element of this kind is preferably used for observing the cooking state of the food containing a relatively large amount of water. But its use is not only limited to the food.

Figures 12, 13, 14:
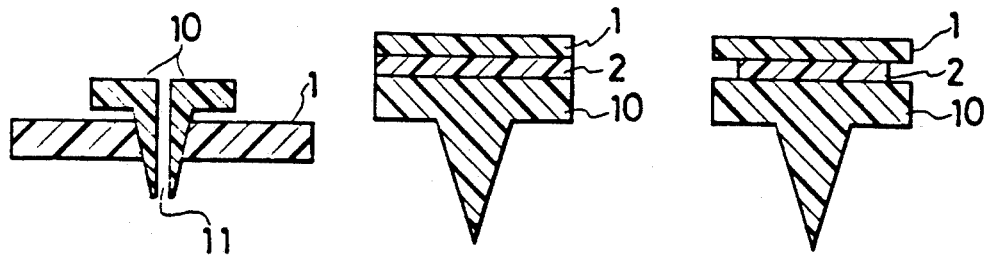

In another embodiment, the heat-shrinking film 1 is bound to the push pin 10 by an adhesive 2 as in FIG. 13. In this case, it is possible to color the side of the push pin 10 facing the adhesive 2 or provide a gauge thereon so as to more clearly indicate the extent of heating by the aid of the degree of shrinking of film 1. Adhesive 2 may be applied over an area smaller than the area of film 1 so that shrinking of the film is easier, as in FIG. 14.

The temperature sensing element according to the present invention may be used not only in heating by a microwave oven, but in heating by any other means.

The temperature sensing element may be applied on a food vessel in advance or may be attached by the cook immediately before cooking. Further, two or more temperature sensing elements may be fixed to the same food vessel to permit the cooking state of the food to be observed more precisely from the shrinking state of these elements during heating.

It is possible to ensure proper cooking by affixing an appropriate indication indicating the proper position for attaching the temperature sensing element of the invention, i.e. indicating the proper position for monitoring temperature, which is determined based on the nature and volume of materials contained in the vessel, the shape of the vessel and so on. Such an indication of the proper position may also include the type and capacity of the microwave oven which should be used.

The temperature sensing element of the invention is produced from easily available materials such as heat-shrinking films and adhesives and may easily be fixed on a vessel to clearly show the heated state and the cooked state of the contents of the vessel, particularly foods.

What is claimed is:

1. A container for food to be heated by a microwave oven, which container has, on an outer surface thereof:
    (A) a temperature sensing element for indicating the temperature of the food contained in the container when the food is being heated by the microwave oven, said sensing element comprising:
        (i) a heat-shrinking film that has a shrinking ration of at least 40% in a given temperature range of the food being heated, and that measures at least about 2 cm by 1 cm; and
        (ii) a fixing means that fixes said film to said container during heating, wherein said fixing means is such that said shrinking ratio of said heat-shrinking film is independent of said fixing means whereby said fixing means does not hinder said film from shrinking during heating; and (B) an indicating means for indicating the extent of heating corresponding to the shrinkage of the temperature sensing element, the indicating means being located adjacent to the temperature sensing element.

2. A container as claimed in claim 1, in which the indicating means is a printed pattern or a color aid.

3. A container as claimed in claim 1, in which the indicating means is a gauge.

4. A container as claimed in any of claims 1 to 3, in which the heat-shrinking film is polyethylene film, irradiated polyethylene film, polypropylene film, polyvinyl chloride film, polyvinylidene chloride film, polyester film or polystyrene film.

5. A container as claimed in any of claims 1 to 3, in which the fixing means is an adhesive.

6. A container as claimed in any of claims 1 to 3, in which the fixing means is an adhesive tape comprising a substrate and an adhesive.

7. A container as claimed in any of claims 1 to 3, in which the fixing means comprises a hollow cover to contain the heat-shrinking film therein and an adhesive to fix the hollow cover to the container.

8. A container as claimed in any of claims 1 to 3, in which the fixing means comprises a hollow cover to contain the heat-shrinking film therein and an adhesive tape to fix the hollow cover to the container.

9. A container as claimed in any one of claims 1 to 3, in which the fixing means comprises a push pin.

10. A container as claimed in any of claims 1 to 3, in which one end of the heat-shrinking film is adapted to be fixed by the fixing means.

* * * * *